United States Patent [19]

Rubinsztajn et al.

[11] Patent Number: 5,747,624
[45] Date of Patent: May 5, 1998

[54] PROCESS FOR REMOVING SILICONE COATINGS AND SEALANTS AND COMPOSITION THEREFORE

[75] Inventors: Slawomir Rubinsztajn, Schenectady, N.Y.; David C. Gross, Hoogerheide, Netherlands

[73] Assignee: General Electric Company, Waterford, N.Y.

[21] Appl. No.: 556,558

[22] Filed: Nov. 13, 1995

[51] Int. Cl.$^6$ ........................................ C08G 77/06
[52] U.S. Cl. ........................ 528/21; 134/38; 528/23
[58] Field of Search .................. 134/98, 38; 528/21, 528/23

[56] References Cited

U.S. PATENT DOCUMENTS

| | | | |
|---|---|---|---|
| 4,089,704 | 5/1978 | Heiss et al. | 134/29 |
| 4,362,570 | 12/1982 | Elwell | 106/311 |
| 4,548,999 | 10/1985 | Steinberger et al. | 525/453 |
| 4,695,597 | 9/1987 | Selno | 521/154 |
| 4,863,985 | 9/1989 | Pouchol et al. | 524/183 |
| 5,270,074 | 12/1993 | Kobayashi et al. | 427/154 |
| 5,403,402 | 4/1995 | LeGrow | 134/38 |
| 5,403,909 | 4/1995 | Rubinsztajn | 528/20 |
| 5,420,221 | 5/1995 | Razzano et al. | 528/16 |

Primary Examiner—Melvyn I. Marquis
Attorney, Agent, or Firm—Kenneth S. Wheelock

[57] ABSTRACT

A composition (comprising) an M-rich silicone and a catalyst is useful for de-polymerizing polymerized silicones thereby facilitating the recycle of electrical devices by enabling the removal of silicone coatings thereon.

8 Claims, No Drawings

PROCESS FOR REMOVING SILICONE COATINGS AND SEALANTS AND COMPOSITION THEREFORE

FIELD OF THE INVENTION

The present invention relates to a method or process for removing silicone coatings and sealants in electrical devices thereby enabling recycling of the devices to recover the various metallic, plastic, and thermoplastic components that are recyclable. In order to accomplish the process of the present invention, the present invention also provides a catalyst to facilitate the depolymerization of the silicone network thereby enabling the process of removing the silicone material.

BACKGROUND OF THE INVENTION

Electronic components or devices are assembled from a wide variety of inorganic and organic materials. Among the inorganic materials are metals, fibrous oxides, e.g. glass fibers, and finely divided oxides, e.g. used as fillers in the organic polymeric components. The organic components consist of polymeric materials such as resins, reinforcing textile fibers such as cellulose fibers and silicone coatings. Most, if not all, of these components are recyclable.

Electrical devices frequently have some type of silicone coating or formed silicone article as a component of the device. The presence of crosslinked or cured silicone compounds in electrical devices presents a problem when it is desired to attempt the recovery of the constituent components of the devices when they are to be recycled or disposed of. Thus the efficient and acceptable removal of conformal silicone coatings, potting compounds and the like from electronic elements such as printed circuit boards, capacitors, bonded aluminum or copper wires, plugs, connectors and the like (hereinafter electrical devices) remains as an unsolved problem.

Currently there are two methods of removing such silicone compounds from electrical devices. The first method involves the use of highly alkaline solutions to attack the silicone coating. Such highly alkaline solutions are for example aqueous sodium hydroxide dodecyltrimethylammonium chloride or a methanol-isopropanol solution of tetramethyl ammonium hydroxide. The electrical device is immersed in such a solution and the caustic attacks the silicone, facilitating its removal by chemical degradation. A second solvent method involves the use of aggressive organic solvents such as toluene, methylene chloride (dichloromethane), dimethyl formamide (N, N-dimethylformamide), methanol, or a mixture. In this case the device is again immersed in the solvent but in contrast to chemical degradation of the silicone that occurs in the presence of strong caustic this is solvent swelling of the silicone network. The solvent swollen silicone coating is removed by peeling, brushing or abrasion from the electrical device.

SUMMARY OF THE INVENTION

As broadly conceived the present invention provides for a silicone composition comprising: a) an M rich silicone compound, and b) a silicone depolymerization catalyst; whereby polymeric silicone compositions may be de-polymerized. M rich silicone compounds are defined as those compounds where the ratio of M groups to the sum of D, T, and Q groups is equal to or greater than 0.04.

There is further provided by virtue of this composition a process for depolymerizing silicones comprising:

(a) forming a mixture of an M rich silicone and a depolymerization catalyst, and (b) contacting a silicone with said mixture whereby said silicone is depolymerized.

A particular application of this depolymerization process provides a method for treating electrical devices wherein said devices comprise a silicone, said method comprising:

(a) forming a mixture of an M rich silicone and a depolymerization catalyst, and (b) contacting said electrical device with said mixture whereby said silicone is depolymerized.

DETAILED DESCRIPTION OF THE INVENTION

As broadly conceived the present invention provides for a silicone composition comprising: a) an M rich silicone compound, and b) a silicone depolymerization catalyst; whereby polymeric silicone compositions may be de-polymerized. M rich silicone compounds are defined as those compounds where the ratio of M groups to the sum of D, T, and Q groups is equal to or greater than 0.04. Preferred M-rich silicones are selected from the group consisting of:

i) MDM, ii) $MD_2M$, and iii) $MD_3M$ where $M=R^1R^2R^3SiO_{1/2}$, $D=R^4R^5SiO_{2/2}$, where $R^1$, $R^2$, and $R^3$ are independently selected from group consisting of hydrogen and one to 18 carbon atom monovalent hydrocarbon radicals, and $R^4$ and $R^5$ are independently selected from the group of 1 to 18 carbon atom monovalent hydrocarbon radicals.

The depolymerization catalysts are selected from the group of catalysts consisting of i) short chain linear phosphazenes having the formula:

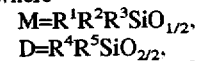

where X is a halogen selected from the group consisting of F, Cl, Br, and I, and n is an integer ranging from 0 to 6 and p is 0 or 1; and ii) linear phosphonitrilic halides having the formula:

where X is a halogen selected from the group consisting of F, Cl, Br, and I, and m is an integer ranging from 0 to 6;

iii) $O(X)_{2-a}Y_aP(NPX2)_bNPX_{3-c}Y_c$, iv) $O(X)_{2-a}Y_aP(NPX2)_bNP(O)X_{2-c}Y_c$ where b is an integer ranging from 0 to 8, a is 0 or 1, c is 0 or 1, X is a halogen selected from the group consisting of fluorine, chlorine, bromine, and iodine, Y is selected from the group consisting of OH, OR and $RCO_2$ where Z is alkyl or aryl; and v) mixtures thereof.

There is further provided by virtue of this composition a process for depolymerizing silicones comprising:

(a) forming a mixture of an M rich silicone and a depolymerization catalyst, and (b) contacting a silicone with said mixture whereby said silicone is depolymerized. Depolymerization is that process where the average molecular weight of a polymer is reduced in fashion whereby such molecular weight reduction is measurable. Further, the depolymerization is preferably conducted to such an extent that the depolymerized silicone is miscible or soluble in M-rich silicones or in common laboratory solvents having a boiling point below about 250° C. This miscibility or solubility of the depolymerized silicone allows the specific process of using the depolymerization process to remove silicones from electrical devices.

Thus, a particular application of this depolymerization process provides a method for treating electrical devices wherein said devices comprise a silicone, said method comprising:

(a) forming a mixture of an M rich silicone and a depolymerization catalyst, and (b) contacting said electrical device with said mixture whereby said silicone is depolymerized.

The degree of polymerization of silicones is controlled during the polymerization reaction by the mole ratio between polymer chain terminating species and chain extending or chain propagating species. Silicones are built up of repeat units, referred to as D units, and branching units referred to as T or Q units. The chain terminating units are referred to as M units. The usual terminology is M for monovalent, D for divalent, T for trivalent and Q for quadrivalent, referring to the catenation positions available in the resulting organosiloxane polymer, where the fundamental repeat unit is a substituted siloxy core having a silicon oxygen unit which catenates.

The most general description of these constituent components of silicone polymers are:

$M = R^1R^2R^3SiO_{1/2}$,
$D = R^4R^5SiO_{2/2}$,
$T = R^6SiO_{3/2}$, and
$Q = SiO_{4/2}$, where $R^1$, $R^2$, $R^3$, $R^4$, $R^5$, $R^6$ are independently selected from the group consisting of hydrogen, hydroxyl, halogen and organic radicals where the organic radicals may be as simple as a methyl group or as complicated as a condensed fused ring polycyclic such as anthracene. Further these organic radicals may be substituted with branching alkyl, alkenyl, or alkynyl side chains or halogen atoms and the cyclic structures may be aliphatic as in cyclohexyl or aromatic as in phenyl and anthracenyl.

These building blocks of silicone polymers may be chemically assembled in a variety of polymeric structures that are simply represented by the following:

$MD_iM$
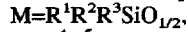
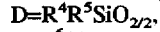
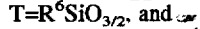
$M_iT_j$,
$M_iD_iT_j$, and
$M_iQ_k$, where the subscripts i, j, k, and l are integers and the degree of polymerization (or average degree of polymerization) is determined by the subscripts i, j, and k with the subscript l for the M chain terminating, chain stopping, or end stopping group determined by that degree of polymerization. If different D and T groups are used in synthesizing so-called co-polymers, i.e. the R substituents on the different D and T groups are themselves different, the number of permutable structures possible becomes very large.

When the R groups are functionalized or the silicone polymer has hydroxy terminations, the individual polymers may be cross linkable by a variety of chemical reactions. The hydroxyl groups attached to a silicon atom will self-condense when catalyzed by an acid or a base. Alkenyl groups can polymerize by a free radical mechanism or can be subjected to a catalyzed addition reaction known as hydrosilation when some the terminating groups are hydrogen. Thus not only can silicones be polymerized through the catenation of the siloxy group Si—O—, they can be further polymerized or cured by reaction of functionalized substituents. These structural varieties lead to a large manifold of useful chemical structures and applications.

Because more than one type of polymerization reaction is frequently utilized in producing silicone compounds that have commercial applications, recycling of articles of manufacture containing silicone polymers becomes problematic. Unlike thermoplastics which if homogeneous, can simply be melted and re-processed, the silicones have usually been secondarily polymerized by a curing reaction, changing a fairly simple high polymer to a cross-linked high polymer or an ultra-high polymer.

We now disclose, that irrespective of the secondary polymerization reactions used to cure silicone polymers, silicones, i.e. polymeric compounds possessing one or more siloxane linkages herein defined as —Si—O—, may be depolymerized by a composition containing a de-polymerization catalyst and a large excess of a compound that will deliver a large excess of chain stopping groups under the de-polymerization conditions. Thus as the siloxy catenation is disrupted by the de-polymerization catalyst, the presence of available chain stopping compounds reacts with the disrupted catenated bond and thus reduces the average degree of polymerization. Depending on the mole ratios this process of de-polymerization may be controlled so that the silicone polymer being so de-polymerized is reduced to soluble components. These soluble components then provide a method of recycling the silicone itself. More importantly when this composition is used to depolymerize silicone coatings in electrical devices, the constituent metals and recyclable thermoplastics and the like constituting the electrical device underneath the silicone coating also become more easily recyclable.

An example of a compound that has a high mole fraction of M groups relative to its total molecular weight (i.e. an M-rich compound) is hexamethyldisiloxane:

$((CH_3)_3Si)_2O$.

In the presence of a catalyst, this particular compound can deliver two moles of $(CH_3)_3SiO_{1/2}$ endgroups per mole of starting material. Further in the presence of an acid catalyst there is no competing polymerization reaction using this particular M-rich compound. Thus, a short chain phosphazane or linear phosphonitrilic compound or a mixture of both, soluble in or miscible with a compound such as $((CH_3)_3Si)_2O$ will provide a means of depolymerizing the silicone polymer and capping the de-polymerized fragments with an M group. This results in a lowering of the average molecular weight of the polymer, however calculated weight average or number average. By de-polymerization (or depolymerization) Applicant defines that process where the number or weight average molecular weight of a polymer is measurably reduced, in the instant process preferably by at least 5 percent, more preferably by at least 10 percent, and most preferably by at least 25 percent By measurably reduced Applicant defines measurably as capable of being measured by the techniques known in and to the art Assuming a sufficient quantity of the M containing compound, the depolymerization reaction is carried out to an extent where the resulting depolymerized species are soluble in the solvent carrying the M containing compound, unless the M containing compound is its own solvent.

Suitable M containing compounds, or M-rich compounds, are defined by the following structural formula:

$MD_qM$ where $M = R^1R^2R^3SiO_{1/2}$, $D = R^4R^5SiO_{2/2}$, where $R^1$, $R^2$, and $R^3$ are independently selected from group consisting of hydrogen and one to 18 carbon atom monovalent hydrocarbon radicals, $R^4$ and $R^5$ are independently selected from the group of 1 to 18 carbon atom monovalent hydrocarbon radicals, and q is an integer ranging from 0 to 40, or are selected from the list MDM, $MD_2M$, $MD_3M$ or mixtures thereof. It is noted that when q is zero, the resulting compound is hexamethyldisiloxane, $((CH_3)_3Si)_2O$.

Applicant defines M rich silicone compounds to be those silicones where the ratio of M groups to the sum of D, T, and Q groups present in the molecule is 0.04 or greater. That is by way of explanation given a silicone of the general formula $M_iD_jT_kQ_p$, the subscripts j, k, and p are integers that are zero or positive and i is a positive non-zero integer, an M rich silicone is defined as one where the subscripts satisfy the criterion $(i/(j+k+p)) \leq 0.04$, preferably this ratio is 0.10 or greater, more preferably this ratio is 0.15 or greater, and most preferably this ratio is 0.20 or greater.

The catalysts compounds utilized to catalyze de-polymerization of silicones must be miscible or soluble in the solvent carrying the M containing compound. A particularly useful group of silicone de-polymerization catalysts, may also be selected from the group of consisting of short chain linear phosphazenes (SCLP) having the formula:

$X_{3-p}(HO)_pP(NPX2)_nNP(O)X_2$, where X is a halogen selected from the group consisting of F, Cl, Br, and I, n is an integer ranging from 0 to 6 and p is 0 or 1; and linear phosphonitrilic halides (LPNC) having the formula:

$X_3P(NPX_2)_mNPX_3(PX_6)$.

where X is a halogen selected from the group consisting of F, Cl, Br, and I, m is an integer ranging from 0 to 6.

EXPERIMENTAL

Preparation of $OCl_2PNPCl_3$(SCLP):

Into a 100 mL flask was placed 20.8 g (0.1 moles) of phosphorus pentachloride ($PCl_5$), 2.93 g ammonium sulfate, and 50 mL of symtetrachloro-ethane (1,1,2,2,-tetrachloroethane). The mixture was heated to reflux and refluxed and stirred for 60 minutes. At completion of the reaction period, the solvent was removed and the product purified by vacuum distillation at 110°–115° C. at 0.1 mm Hg. The yield of SCLP as light yellow crystals was 20 g.

Preparation of linear phosphonitrilic chlorides (LPNC):

Into a 100 mL flask was placed 20.5 g of phosphorus pentachloride, 2.7 g ammonium chloride, and 50 mL of tetrachloroethane. The mixture was reacted for eight hours at reflux. At completion of the reaction the mixture was diluted with petroleum ether resulting in a precipitate of crude product. The crude product precipitate was re-dissolved in methylene chloride and re-precipitated with petroleum ether. Residual solvent was removed under vacuum resulting in a 14 g yield of light yellow crystals of LPNC.

Preparation of phosphazene compounds:

The preparation of $O(X)_{2-a}Y_aP(NPX2)_bNPX_{3-c}Y_c$, and $O(X)_{2-a}Y_aP(NPX2)_bNP(O)X_{2-c}Y_c$ is taught in U.S. Pat. No. 5,403,909.

Preparation of Silicone Dissolution Solution A:

Into a 250 mL flask was placed 100 g of hexamethyldisiloxane and 2.0 g of SCLP. The resulting mixture initially consisted of two phases which was then heated under nitrogen at 60° C. and vigorously stirred until a homogeneous mixture resulted.

Preparation of Silicone Dissolution Solution B:

Into a 250 mL flask was placed 100 g of hexamethyldisiloxane and 2.0 g LPNC. The resulting mixture initially consisted of two phases which was then heated under nitrogen at 60° C. and vigorously stirred until a homogeneous mixture resulted.

Experiment 1

This experiment demonstrates removal of a conformal silicone coating from a printed circuit board using silicone dissolution solution A. Into a 500 mL beaker was placed 200 g of hexamethyldisiloxane and 5 g of silicone dissolution solution A. The resulting mixture was heated to 50° C. After reaching the desired temperature, a circuit board coated with a silicone conformal coating was immersed in the cleaning mixture comprising hexamethyldisiloxane and silicone dissolution catalyst The silicone coating on the circuit board was removed within a time period of 15 minutes with no or only minimal damage to the circuit board. The circuit board was subsequently washed clean of the cleaning mixture with a solvent mixture comprising isopropanol and water.

Experiment 2

This experiment demonstrates removal of a conformal silicone coating from a printed circuit board using silicone dissolution solution B. Into a 500 mL beaker was placed 200 g of hexamethyldisiloxane and 5 g of silicone dissolution solution B. The resulting mixture was heated to 50° C. After reaching the desired temperature, a circuit board coated with a silicone conformal coating was immersed in the cleaning mixture comprising hexamethyldisiloxane and silicone dissolution catalyst. The silicone coating on the circuit board was removed within a time period of 15 minutes with no or only minimal damage to the circuit board. The circuit board was subsequently washed clean of the cleaning mixture with a solvent mixture comprising isopropanol and water.

Experiment 3

Coupons of glass, aluminum and Lexan H® were coated with a commercial silicone sealant, general Electric SCS 1001®. A 500 mL beaker was charged with 200 g of hexamethyldisiloxane and 5 gm of silicone dissolution solution B. This mixture was heated to 50° C. The coupons were immersed in the hot dissolution solution. The removal of the silicone was complete in 10 hours with minimal damage to the surface of the coupons.

Experiment 4

Experiment 3 was repeated using General Electric sealant SCS 2801®. Removal of the silicone was complete in 16 hours with minimal damage to the coupons.

Experiment 5

Experiment 3 was repeated using General Electric sealant SCS 2004®. The silicone was not dissolved in this experiment, however it did swell facilitating the mechanical removal subsequently.

All United States Patents referenced herein are hereby and herewith specifically incorporated by reference.

Having described the invention that which is claimed is:

1. A process for depolymerizing a polymeric compound possessing one or more siloxane linkages comprising a silicone conformal coating comprising:

(a) forming a mixture of an M rich silicone and a depolymerization catalyst selected from the group of consisting of:

i) $X_{3-p}(HO)_pP(NPX2)_nNP(O)X_2$, where X is a halogen selected from the group consisting of F, Cl, Br, and I and n is an integer ranging from 0 to 6 and p is 0 or 1; and ii) $X_3P(NPX_2)_mNPX_3(PX_6)$, where X is a halogen selected from the group consisting of F, Cl, Br, and I, and m is an integer ranging from 0 to 6;

iii) $O(X)_{2-a}Y_aP(NPX2)_bNPX_{3-c}Y_c$ where b is an integer ranging from 0 to 8, a is 0 or 1, c is 0 or 1, X is a halogen selected from the group consisting of fluorine, chlorine, bromine, and iodine, Y is selected from the group consisting of OH, OR and $RCO_2$ where Z is alkyl or aryl;

iv) $O(X)_{2-a}Y_aP(NPX2)_bNP(O)X_{2-c}Y_c$ where b is an integer ranging from 0 to 8, a is 0 or 1, c is 0 or 1, X is a halogen selected from the group consisting of fluorine, chlorine, bromine, and iodine, Y is selected from the group consisting of OH, OR and $RCO_2$ where Z is alkyl or aryl; and v) mixtures thereof, and (b) contacting a silicone with said mixture whereby said polymeric compound is depolymerized wherein said silicone conformal coating is removed.

2. The process of claim 1 where the M rich silicone compound has a ratio of M groups to the sum of D, T, and Q groups equal to greater or than 0.04.

3. The process of claim 1 where the M rich silicone compound has a ratios of M groups to the sum of D, T, and Q groups equal to greater or than 0.10.

4. The process of claim 1 where the M rich silicone compound has a ratio of M groups to the sum of D, T, and Q groups equal to greater or than 0.15.

5. The process of claim 1 where the M rich silicone compound has a ratio of M groups to the sum of D, T, and Q groups equal to greater or than 0.25.

6. The process of claim 1 where the M rich silicone compound has a ratio of M groups to the sum of D, T, and Q groups equal to greater or than 0.10.

7. The process of claim 6 where the M rich silicone compound is selected from the group consisting of:

i) MDM, ii) $MD_2M$, and iii) $MD_3M$ where $M=R^1R^2R^3SiO_{1/2}$, $D=R^4R^5SiO_{2/2}$ where $R^1$, $R^2$, and $R^3$ are independently selected from group consisting of hydrogen and one to 18 carbon atom monovalent hydrocarbon radicals, and $R^4$ and $R^5$ are independently selected from the group of 1 to 18 carbon atom monovalent hydrocarbon radicals.

8. A method for treating electrical devices wherein said devices comprise a silicone, said method comprising:

(a) forming a mixture of an M rich silicone and a depolymerization catalyst selected from the group consisting of i) $X_{3-p}(HO)_pP(NPX2)_nNP(O)X_2$, where X is a halogen selected from the group consisting of F, Cl, Br, and I, and n is an integer ranging from 0 to 6 and p is 0 or 1; and ii) $X_3P(NPX_2)_mNPX_3(PX_6)$, where X is a halogen selected from the group consisting of F, Cl, Br, and I, and m is an integer ranging from 0 to 6;

iii) $O(X)_{2-a}Y_aP(NPX2)_bNPX_{3-c}Y_c$ where b is an integer ranging from 0 to 8, a is 0 or 1, c is 0 or 1, X is a halogen selected from the group consisting of fluorine, chlorine, bromine, and iodine, Y is selected from the group consisting of OH, OR and $RCO_2$ where Z is alkyl or aryl;

iv) $O(X)_{2-a}Y_aP(NPX2)_bNP(O)X_{2-c}Y_c$ where b is an integer ranging from 0 to 8, a is 0 or 1, c is 0 or 1, X is a halogen selected from the group consisting of fluorine, chlorine, bromine, and iodine, Y is selected from the group consisting of OH, OR and $RCO_2$ where Z is alkyl or aryl; and v) mixtures thereof; and (b) contacting said electrical device with said mixture whereby said silicone is depolymerized.

\* \* \* \* \*